(12) United States Patent
Gallucci et al.

(10) Patent No.: US 9,045,636 B2
(45) Date of Patent: Jun. 2, 2015

(54) BLOW MOLDABLE POLYIMIDE/POLYAMIDE COMPOSITION, PROCESS FOR BLOW MOLDING AND ARTICLES MADE THEREBY

(75) Inventors: Robert R. Gallucci, Mt. Vernon, IN (US); Sanjay Braj Mishra, Evansville, IN (US); Norimitsu Yamaguchi, Newburgh, IN (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 1079 days.

(21) Appl. No.: 11/852,549

(22) Filed: Sep. 10, 2007

(65) Prior Publication Data
US 2009/0068432 A1      Mar. 12, 2009

(51) Int. Cl.
| | |
|---|---|
| *C08K 3/16* | (2006.01) |
| *C08K 5/13* | (2006.01) |
| *C08K 5/49* | (2006.01) |
| *C08K 7/14* | (2006.01) |
| *C08L 77/00* | (2006.01) |
| *C08L 79/08* | (2006.01) |
| *C08L 77/02* | (2006.01) |
| *B29C 49/00* | (2006.01) |
| *B29C 49/04* | (2006.01) |
| *B29K 77/00* | (2006.01) |

(Continued)

(52) U.S. Cl.
CPC ............. *C08L 79/08* (2013.01); *B29C 49/0005* (2013.01); *B29C 49/04* (2013.01); *B29K 2077/00* (2013.01); *B29K 2079/08* (2013.01); *B29K 2105/0026* (2013.01); *B29K 2105/0032* (2013.01); *B29K 2105/0044* (2013.01); *B29K 2105/005* (2013.01); *B29K 2105/06* (2013.01); *B29K 2105/16* (2013.01); *B29K 2995/0005* (2013.01); *B29L 2031/7158* (2013.01); *B29L 2031/7172* (2013.01); *C08K 3/16* (2013.01); *C08K 5/13* (2013.01); *C08K 5/49* (2013.01); *C08K 7/14* (2013.01); *C08L 77/00* (2013.01); *C08L 77/02* (2013.01)

(58) Field of Classification Search
CPC ............ C08L 77/00; C08L 79/08; C08K 3/40
USPC ........................... 525/419, 432; 524/147–153
See application file for complete search history.

(56) References Cited

U.S. PATENT DOCUMENTS

| | | | |
|---|---|---|---|
| 3,803,085 | A | 4/1974 | Takehoshi et al. |
| 3,847,867 | A | 11/1974 | Heath et al. |

(Continued)

FOREIGN PATENT DOCUMENTS

| | | |
|---|---|---|
| EP | 0104659 | 1/1988 |
| EP | 0410514 | 1/1991 |
| EP | 0926203 | 6/1999 |

OTHER PUBLICATIONS

Moncrieff (Man-Made Fibres. 6th ed. A Halsted Press Book, John Wiley & Sons, 1975, pp. 51-54 and 392-393).*

(Continued)

*Primary Examiner* — Brieann R Fink
(74) *Attorney, Agent, or Firm* — Cantor Colburn LLP; Diderico van Eyl

(57) ABSTRACT

Thermoplastic compositions comprising polyamide, polyimide, an organo phosphorus compound and an optional reinforcing filler are described. The subject compositions are useful in blow molding methods. A method of blow molding is also described as well as articles made by the method.

10 Claims, 1 Drawing Sheet

1/100 rad/sec. visc. ratio
45/40/15 PEI/PA6/GF@330 C

(51) Int. Cl.
  *B29K 79/00* (2006.01)
  *B29K 105/00* (2006.01)
  *B29K 105/06* (2006.01)
  *B29K 105/16* (2006.01)
  *B29L 31/00* (2006.01)

(56) References Cited

U.S. PATENT DOCUMENTS

| | | | |
|---|---|---|---|
| 3,850,885 A | 11/1974 | Takakoshi et al. | |
| 3,852,242 A | 12/1974 | White | |
| 3,855,178 A | 12/1974 | White | |
| 3,905,942 A | 9/1975 | Takekoshi et al. | |
| 3,972,902 A | 8/1976 | Heath et al. | |
| 3,983,093 A | 9/1976 | Williams, III et al. | |
| 4,443,591 A | 4/1984 | Schmidt et al. | |
| 4,455,410 A | 6/1984 | Giles, Jr. | |
| 4,612,353 A | 9/1986 | Andrews et al. | |
| 4,657,987 A | 4/1987 | Rock et al. | |
| 4,873,286 A | 10/1989 | Gallucci et al. | |
| 4,970,272 A | 11/1990 | Gallucci | |
| 5,013,799 A | 5/1991 | Giles, Jr. et al. | |
| 5,166,246 A | 11/1992 | Gallucci et al. | |
| 5,296,558 A | 3/1994 | Hood et al. | |
| 5,639,819 A * | 6/1997 | Farkas et al. | 524/606 |
| 6,001,957 A * | 12/1999 | Puyenbroek et al. | 528/332 |
| 6,770,693 B2 * | 8/2004 | Stein et al. | 524/128 |
| 6,822,032 B2 | 11/2004 | Gallucci | |
| 6,919,422 B2 * | 7/2005 | Gallucci et al. | 528/353 |
| 2003/0004280 A1 | 1/2003 | Gallucci | |
| 2005/0203223 A1 * | 9/2005 | Ohyama et al. | 524/100 |
| 2006/0058432 A1 * | 3/2006 | Perego et al. | 524/115 |
| 2006/0155066 A1 * | 7/2006 | Crevecoeur et al. | 525/178 |
| 2007/0065615 A1 | 3/2007 | Odle et al. | |
| 2007/0066740 A1 | 3/2007 | Odle et al. | |
| 2008/0146707 A1 * | 6/2008 | Kernick et al. | 524/140 |
| 2012/0208937 A1 * | 8/2012 | Prusty et al. | 524/100 |
| 2014/0066551 A1 * | 3/2014 | Grcev et al. | 524/100 |

OTHER PUBLICATIONS

PolyMate Additives (Irganox 1098 equivalent, 1 page).*
Ultem (Sabic Innovative Plastics: Polyetherimide resin additives, 2011, 1 page).*
Vydyne Product Information (Vydyne 21, 2002, 3 pages).*
Radici Group (Polyamide 66:Radipol A40D, 4 pages).*
Ciba (Ciba IRGAFOS 1168 Processing Stabilizer, May 31, 2005, 3 pages).*
Gendebien (Polyvalent (HR) PA CS grade: DS 1103/4 Comparison with DS 1105; 12D-10P & 173X-11C. Owens Corning. Oct. 2002, 9 pages).*
International Search Report for International Application No. PCT/US2008/075792, mailed May 4, 2009, 3 pages.
Written Opinion for International Search Report for International Application No. PCT/US2008/075792, mailed May 4, 2009, 8 pages.
Polyamides, RADICI Plastics Information Catalog, 2012, 28 pages.

* cited by examiner

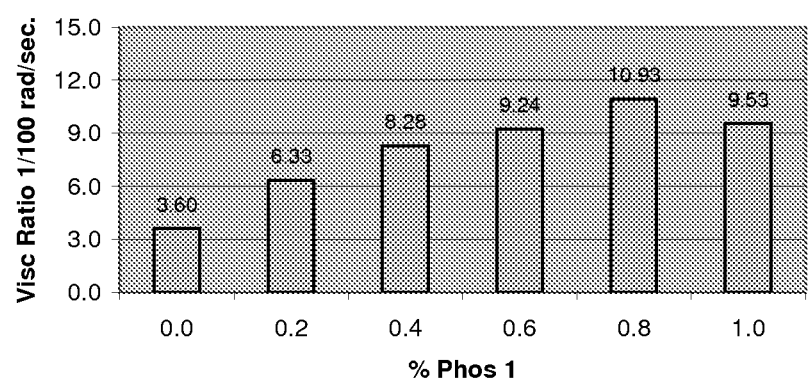

BLOW MOLDABLE POLYIMIDE/POLYAMIDE COMPOSITION, PROCESS FOR BLOW MOLDING AND ARTICLES MADE THEREBY

BACKGROUND OF THE INVENTION

Disclosed herein are compositions comprising polyimides and polyamides useful for blow molding. Also disclosed are processes for the making of blow molded articles.

Blends of polyimide resins and polyamide resins possess various useful properties and are described in U.S. Pat. Nos. 5,013,799 and 4,657,987 and European Patent No. 0 104 659 B1. These polymer blends afford combined performance features not generally observed in the individual resins. The polyamide resin (also known as nylon resin) improves polyimide processability and solvent resistance while the polyimide resin improves the dimensional stability of the polyamide. While polyimide/polyamide blends have many useful features, they are difficult to melt process into large parts by blow molding techniques. Accordingly, there is a need for polyimide/polyamide blends useful in blow molding.

BRIEF DESCRIPTION OF THE INVENTION

Polyimide/polyamide blends have been difficult to process into large parts by blow molding because their melt viscosity and melt elasticity are low. The low melt viscosity and low melt elasticity are especially notable at the high temperatures, often greater than 300° C., needed to plasticize the polyimide and melt crystalline polyamide resins. It is now possible to make compositions having suitable melt viscosities for blow molding processes. More particularly, we have unexpectedly found that the use of mono functional or difunctional organo phosphorus compounds results in polyimide/polyamide blends having high melt elasticity and high melt viscosity suitable for blow molding into shaped articles with uniform wall thickness, having high heat resistance, high impact strength, and high tensile strength.

Disclosed herein is a thermoplastic composition comprising:
a) 30 to 70 weight percent (wt %) polyamide;
b) 70 to 30 wt % polyimide;
c) 0 to 40 wt % reinforcing filler;
d) 0.1 to 3.0 wt % of an organo phosphorus compound;
wherein the composition has a ratio of a melt viscosity at a shear rate of 1 radian per second to a melt viscosity at 100 radians per second (rad/sec), of 4.0 to 16.0, at 330° C.; a reverse notched Izod impact strength of greater than or equal to 250 Joules per meter (J/m), and a heat distortion temperature (HDT), measured at 66 pounds per square inch (psi) (0.45 MPa), of greater than or equal to 175° C.; and further wherein weight percent is based on the combined weight of polyimide and polyamide.

In an embodiment, a thermoplastic composition comprises:
a) 40 to 60 weight percent of a crystalline polyamide having a melting point of 200 to 320° C. and an amine end group concentration of 30 to 100 milliequivalents;
b) 60 to 40 weight percent of a polyetherimide having a glass transition temperature of 200 to 310° C. and a weight average molecular weight of 10,000 to 70,000 grams per mole as measured by gel permeation chromatography using a polystyrene standard;
c) 0.1 to 2.0 weight percent of an organo phosphorus compound having a molecular weight of greater than or equal to 500 grams per mole;
d) an additive comprising an alkali metal iodide, a copper salt, a hindered phenol compound, or a combination comprising two or more of the foregoing,
wherein the composition has a ratio of melt viscosity at a shear rate of 1 radian per second to a melt viscosity at 100 radians per second (rad/sec), of 4.0 to 12.0, at 330° C.; a reverse notched Izod impact strength of greater than or equal to 250 Joules per meter (J/m), and a heat distortion temperature, measured at 66 psi (0.45 MPa), of greater than or equal to 190° C.; and
further wherein weight percent is based on the combined weight of polyimide and polyamide.

In another embodiment, a thermoplastic composition comprises:
a) 40 to 60 weight percent of a crystalline polyamide having a melting point of 200 to 320° C. and an amine end group concentration of 30 to 100 milliequivalents;
b) 60 to 40 weight percent of a polyetherimide having a glass transition temperature of 200 to 310° C. and a weight average molecular weight of 10,000 to 70,000 grams per mole as measured by gel permeation chromatography using a polystyrene standard;
c) 5 to 30 weight percent of glass fiber having an average fiber diameter of 5 to 20 micrometers;
d) 0.1 to 2.0 weight percent of an organo phosphorus compound having a molecular weight of greater than or equal to 500 grams per mole;
wherein the composition has a ratio of melt viscosity at a shear rate of 1 radian per second to a melt viscosity at 100 radians per second (rad/sec), of 4.0 to 12.0, at 330° C.; a reverse notched Izod impact strength of greater than or equal to 250 Joules per meter (J/m), and a heat distortion temperature, measured at 66 psi (0.45 MPa), of greater than or equal to 190° C.; and
further wherein weight percent is based on the combined weight of polyimide and polyamide.

Also disclosed herein is a process for blow molding an article comprising:
drying a thermoplastic composition to a moisture content of less than 150 parts by weight per million parts by weight of the thermoplastic composition to form a dried thermoplastic composition;
heating the dried thermoplastic composition in a screw driven melt processing device to a temperature of 270 to 370° C. to form a molten composition;
pushing the molten composition through an orifice to create an annular tube with a wall thickness of 1 to 15 millimeters (mm), an outer diameter of 2 to 100 centimeters (cm), and a length of greater than or equal to 5 cm;
closing off an end of the annular tube to form a closed ended annular tube and encasing it in a mold;
blowing a gas into the closed ended annular tube while the polymer blend is still above the crystallization temperature of the polyamide until the closed ended annular tube has an outer diameter that is greater than or equal to 1.3 times the outer diameter of the annular tube and assumes the shape of the mold to form a shaped tube;
cooling the shaped tube to temperature below the polyamide crystallization temperature to form the article;
opening the mold and removing the article,
wherein at least a portion of the article is hollow and the largest inner diameter is greater than or equal to 26 millimeters (mm);
wherein the thermoplastic composition comprises:
a) 30 to 70 wt % of a polyamide;
b) 70 to 30 wt % polyimide;

c) 0 to 40 wt % fiber glass;

d) 0.1 to 3.0 wt % of an organo phosphorus compound;

wherein the composition has a ratio of a melt viscosity at a shear rate of 1 radian per second to a melt viscosity at 100 radians per second, of 4.0 to 16.0, at 330° C.;

wherein weight percent is based on the combined weight of polyimide and polyamide.

Also disclosed herein are articles made using the method described above.

BRIEF DESCRIPTION OF THE DRAWINGS

FIG. 1 is a graphical representation of data found in Table 2.

DETAILED DESCRIPTION OF THE INVENTION

As mentioned above, the melt elasticity of a composition is important physical property for blow molding, particularly for blow molding large parts. Melt elasticity can be measured by several methods, one example is by comparing the melt viscosity of a polymer blend at a low shear rate, for instance 1 radian/sec (rad/sec), to the viscosity at a higher shear rate, for example 100 rad/sec. In a resin with high melt elasticity, or high melt strength, there will be a large decrease in viscosity going from lower to higher shear rate. This behavior is sometimes called shear thinning. In resins with poor melt strength there will be a smaller decrease in viscosity versus shear rate. Resins with a small decrease in viscosity versus shear rate are often referred to as having Newtonian behavior. Resins with a larger decrease in viscosity versus shear rate are often referred to as having non-Newtonian behavior. Resins with non-Newtonian behavior are more useful for melt processing involving blow molding. In blow molding it is desirable to have resin that will flow through a narrow orifice, (a high shear situation) but will have sufficient melt strength (or melt elasticity) such that after passing through the orifice the molten polymer will support its own weight without excessive sagging (a low shear condition). If the resin can support its own weight after passing through the orifice it will produce an annular tube that will show little sagging and will have a more uniform wall thickness; such an annular tube can be shaped into a blow molded article. As parts get larger, for example, weighing greater than or equal to 100 grams (g), or greater than or equal to 1000 g, the need for high melt strength is even more important as the molten polymer must support more weight. Thus there are special theological needs for blow molding large parts.

In some embodiments the ratio of melt viscosity at 1 rad/sec to melt viscosity at 100 rad/sec is 4.0 to 16.0 at 330° C. for large part blow molding. In some embodiments the melt viscosity ratio is 4.0 to 12.0, or, more specifically, 4.5 to 10.0.

Melt viscosity is effected by temperature as well as shear rate. In most instances (for thermoplastic resin compositions) viscosity decreases sharply as temperature is increased. Due to their high glass transition temperature (Tg), often greater than 200° C., polyimide resins require very high melt processing temperatures, often 100, 125 or 150° C. above the polyimide Tg. At this high melt processing temperature (300 to 400° C. for example) polyamides, such as nylon 6 or nylon 6,6, have very low melt viscosity. Independent of the ratio of melt viscosity at low and high shear rates the thermoplastic composition also needs to have sufficiently high melt viscosity for blow molding. In some embodiments the thermoplastic composition has a melt viscosity at 100 rad/sec and 330° C. of 2,000 to 60,000 poise (P), or, more specifically, 2,000 to 30,000 P at 330° C., or, more specifically, 3,000 to 20,000 P at 330° C. If the polyimide Tg is too high, for example greater than or equal to 310° C., the blend may require a melt processing temperature that is too high, for example greater than 450° C., resulting in decomposition of the polymers and additives in the composition.

The terms "first," "second," and the like, "primary," "secondary," and the like, "(a)," "(b)" and the like, as used herein do not denote any order, quantity, or importance, but rather are used to distinguish one element from another. The terms "a" and "an" do not denote a limitation of quantity, but rather denote the presence of at least one of the referenced item. "Optional" or "optionally" means that the subsequently described event or circumstance may or may not occur, and that the description includes instances where the event occurs and instances where it does not. The endpoints of all ranges directed to the same component or property are inclusive of the endpoint and independently combinable. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) may be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl radical.

The term "alkyl" is intended to include both branched and straight-chain, saturated aliphatic hydrocarbon radicals having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl.

The term "alkenyl" is defined as a branched or straight-chain unsaturated aliphatic hydrocarbon radical having one or more double bonds between two or more carbon atoms. Examples of alkenyl radicals include ethenyl, propenyl, butenyl, pentenyl, hexenyl, heptenyl, octenyl and nonenyl and the corresponding $C_{2-10}$ dienes, trienes and quadenes.

The term "substituted" means that one or more hydrogens on the molecule, portion of the molecule, or atom are replaced with substitution groups provided that an atom's normal valency is not exceeded, and that the substitution results in a stable compound. Such "substitution groups" may be selected from the group consisting of: —OR, —NR'R, —C(O)R, —SR, -halo, —CN, —NO$_2$, —SO$_2$, phosphoryl, imino, thioester, carbocyclic, aryl, heteroaryl, alkyl, alkenyl, bicyclic and tricyclic groups. When a substitution group is a keto (i.e., =O) group, then 2 hydrogens on the atom are replaced. Keto substituents are not present on aromatic moieties. The terms R and R' refer to alkyl radicals that may be the same or different.

The description is intended to include all permutations and combinations of the substitution groups as described by the formulas herein with the proviso that each permutation or combination can be selected by specifying the appropriate variable or substitution groups.

Thus, for example, the term "substituted $C_{1-10}$ alkyl" refers to alkyl moieties containing saturated bonds and having one or more hydrogens replaced by, for example, halogen, carbonyl, alkoxy, ester, ether, cyano, phosphoryl, imino, alkylthio, thioester, sulfonyl, nitro, heterocyclo, aryl, or heteroaryl.

The terms "halo", "halide" or "halogen" as used herein refer to fluoro, fluoride, chloro, chloride, bromo, bromide, iodo or iodide as appropriate in context.

The term "monocyclic" as used herein refers to groups comprising a single ring system. The ring system may be aromatic, heterocyclic, aromatic heterocyclic, a saturated cycloalkyl, or an unsaturated cycloalkyl. The monocyclic group may be substituted or unsubstituted. Monocyclic alkyl groups may have 5 to 12 ring members.

The term "polycyclic" as used herein refers to groups comprising multiple ring systems. The rings may be fused or unfused. The polycyclic group may be aromatic, heterocyclic, aromatic heterocyclic, a saturated cycloalkyl, an unsaturated cycloalkyl, or a combination of two or more of the foregoing. The polycyclic group may be substituted or unsubstituted. Polycyclic groups may have 6 to 20 ring members.

The term "independently selected from", "independently, at each occurrence" or similar language, means that the labeled R substitution groups may appear more than once and may be the same or different when appearing multiple times in the same structure. Thus the $R^1$ may be the same or different than the $R^6$ and if the labeled $R^6$ substitution group appears four times in a given permutation of Formula I, then each of those labeled $R^6$ substitution groups may be, for example, a different alkyl group falling within the definition of $R^6$.

Other than in operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations.

Polyimide resins have the general formula (I)

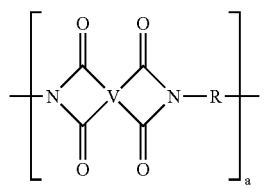

(I)

wherein a is greater than or equal to 10, or specifically 10 to 1000 or more, or, more specifically, 50 to 500; and V is a tetravalent linker without limitation, as long as the linker does not impede synthesis or use of the polyimide. Suitable linkers include but are not limited to: (a) substituted or unsubstituted, saturated, unsaturated or aromatic monocyclic and polycyclic groups having 5 to 50 carbon atoms, (b) substituted or unsubstituted, linear or branched, saturated or unsaturated alkyl groups having 1 to 30 carbon atoms; or combinations thereof. Suitable substitutions and/or linkers include, but are not limited to, ethers, amides, esters, and combinations thereof. Exemplary linkers include, but are not limited to, tetravalent aromatic radicals of formula (II),

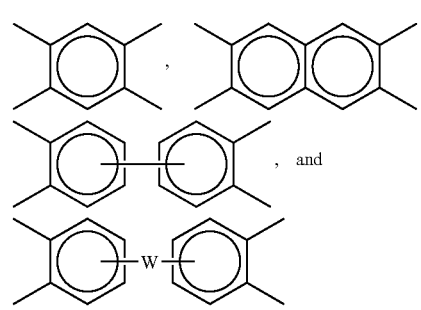

(II)

wherein W is a divalent moiety selected from the group consisting of —O—, —S—, —C(O)—, —SO$_2$—, C$_y$H$_{2y}$—(y being an integer from 1 to 5), and halogenated derivatives thereof, including perfluoroalkylene groups, or a group of the formula —O—Z—O— wherein the divalent bonds of the —O— or the —O—Z—O— group are in the 3,3',3,4',4,3', or the 4,4' positions, and wherein Z includes, but is not limited, to divalent radicals of formula (III)

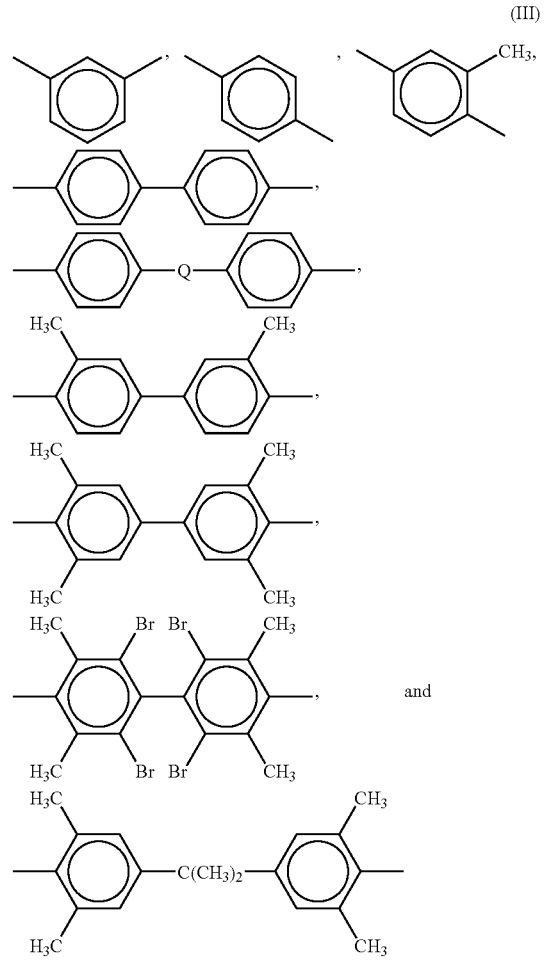

(III)

R in formula (I) includes but is not limited to substituted or unsubstituted divalent organic radicals such as: (a) aromatic groups or halogenated, ether, sulfo, sulfone or carbonyl derivatives thereof; (b) straight or branched chain alkylene radicals having 2 to 20 carbon atoms; (c) cycloalkylene radicals having 3 to 20 carbon atoms, or (d) divalent radicals of the general formula (IV)

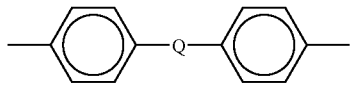

(IV)

wherein Q includes but is not limited to a divalent moiety selected from the group consisting of —O—, —S—, —C(O)—, —SO$_2$—, C$_y$H$_{2y}$— (y being an integer from 1 to 5), and halogenated derivatives thereof, including perfluoroalkylene groups.

Exemplary polyimides include those whose preparation and properties are described in U.S. Pat. Nos. 3,803,085 and 3,905,942.

In some embodiments the polyimide is or comprises a polyetherimide. Polyetherimide resins comprise more than 10, or, specifically 10 to 1000 or more, or, more specifically 50 to 500 structural units, of the formula (V)

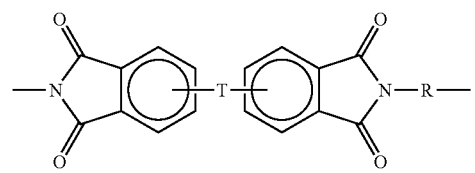

(V)

wherein T is —O— or a group of the formula —O—Z—O— wherein the divalent bonds of the —O— or the —O—Z—O— group are in the 3,3',3,4',4,3', or the 4,4' positions, and wherein Z includes, but is not limited to, divalent radicals of formula (III) as defined above. R is as defined above.

In some embodiments, the polyetherimide is a copolymer which, in addition to the etherimide units described above in formula (V), further comprises polyimide structural units of formula (VI)

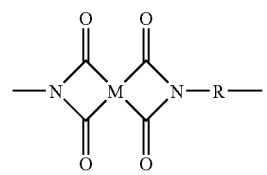

(VI)

wherein R is as previously defined for formula (I) and M includes, but is not limited to, radicals of formula (VII)

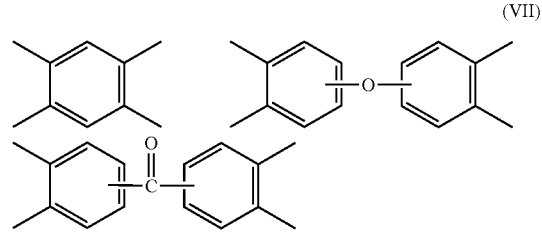

(VII)

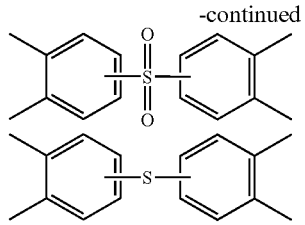

The polyetherimide can be prepared by any of the methods known to those skilled in the art, including the reaction of an aromatic bis-ether anhydride of the formula (VIII)

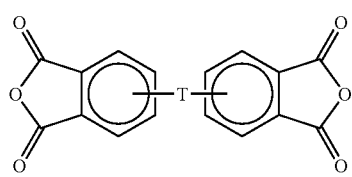

(VIII)

with an organic diamine of the formula (IX)

H$_2$N—R—NH$_2$ (IX)

wherein T and R are defined as described above in formulas (I) and (IV). Polyetherimides can also be derived from reaction of or aromatic tetracarboxylic acids or derivatives capable of forming cyclic anhydrides and aromatic diamines, or chemically equivalent derivatives, to form cyclic imide linkages.

Included among the many methods of making the polyimides, particularly polyetherimide polymers, are those disclosed in U.S. Pat. Nos. 3,847,867, 3,850,885, 3,852,242, 3,855,178, 3,983,093, 4,443,591 and 7,041,773. These patents are provided for the purpose of teaching, by way of illustration, general and specific methods for preparing polyetherimides. Examples of specific aromatic bis-anhydrides and organic diamines are disclosed, for example, in U.S. Pat. Nos. 3,972,902 and 4,455,410.

Examples of aromatic bis anhydrides include: 2,2-bis(4-(3,4-dicarboxyphenoxy)phenyl)propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis([4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; -4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof. In some embodiments the dianhydride comprises bisphenol-A dianhydride, benzophenone dianhydride, pyromellitic dianhydride, biphenylene dianhydride and oxy dianhydride.

Exemplary aromatic organic diamines include, for example: m-phenylenediamine; p-phenylenediamine; 4,4'-diaminodiphenylpropane, 4,4'-diaminodiphenylmethane (commonly named 4,4'-methylenedianiline); 4,4'-diaminodiphenyl sulfide; 4,4'-diaminodiphenyl sulfone; 4,4'-diaminodiphenyl ether (commonly named 4,4'-oxydianiline); 1,5-diaminonaphthalene; 3,3-dimethylbenzidine; 3,3-dimethoxybenzidine; 2,4-bis(beta-amino-t-butyl)toluene; bis(p-beta-amino-t-butylphenyl)ether; bis(p-beta-methyl-o-aminophenyl)benzene; 1,3-diamino-4-isopropylbenzene; 1,2-bis(3-aminopropoxy)ethane; benzidine; m-xylenediamine; and mixtures of such diamines. In some embodiments the diamine comprises meta phenylene diamine, para phenylene diamine, diamino phenyl sulfones, oxydianilines or a combination comprising two or more of the foregoing.

One route for the synthesis of polyetherimides proceeds through a bis(4-halophthalimide) having formula (X):

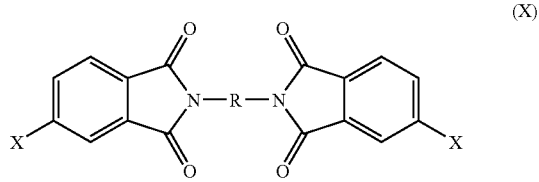

(X)

wherein R is as described above and X is a halogen. The bis(4-halophthalimide) wherein R is a 1,3-phenyl group (XI) is particularly useful.

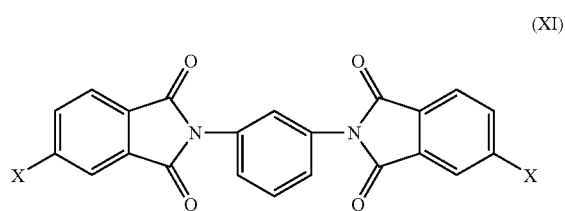

(XI)

Bis(halophthalimide)s (X) and (XI) are typically formed by the condensation of amines, e.g., 1,3-diaminobenzene with anhydrides, e.g., 4-halophthalic anhydride (XII):

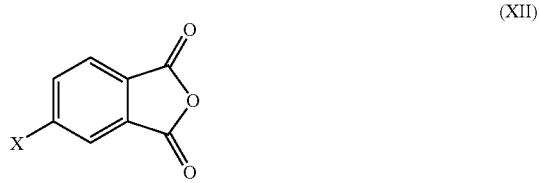

(XII)

Polyetherimides may be synthesized by the reaction of the bis(halophthalimide) with an alkali metal salt of a bisphenol such as bisphenol A or a combination of an alkali metal salt of a bisphenol and an alkali metal salt of another dihydroxy substituted aromatic hydrocarbon in the presence or absence of phase transfer catalyst. Suitable phase transfer catalysts are disclosed in U.S. Pat. No. 5,229,482. Suitable dihydroxy substituted aromatic hydrocarbons include those having the formula (XIII)

OH-A²-OH  (XIII)

wherein $A^2$ is a divalent aromatic hydrocarbon radical. Suitable $A^2$ radicals include m-phenylene, p-phenylene, 4,4'-biphenylene, and similar radicals.

The polyimide resins can have an intrinsic viscosity greater than 0.2 deciliters per gram, or, more specifically, 0.35 to 1.5 deciliters per gram measured in chloroform or m-cresol at 25° C. In some embodiments, the polyimide resins have a weight average molecular weight of 10,000 to 100,000 grams per mole ("g/mol"), or, more specifically, 10,000 to 70,000 g/mol, or, more specifically, 20,000 to 70,000 g/mol, as measured by gel permeation chromatography using a polystyrene standard. In some embodiments the polyimide has a glass transition temperature of 200 to 310° C.

Polyetherimides are sold commercially by General Electric Plastics under the ULTEM® trade name.

Use of mixtures of polyetherimides having the same structure but different molecular weights may be useful to control melt properties such as melt flow index. Mixtures of chemically different polyetherimides are also specifically contemplated.

Polyamide resins, also known as nylons, are characterized by the presence of an amide group (—C(O)NH—), and are described in U.S. Pat. Nos. 4,970,272 and 4,873,286. Polyamide resins include all known polyamides and include polyamide-6, polyamide-6,6, polyamide-11, polyamide-12, polyamide-4,6, polyamide-6, 10 and polyamide-6,12, as well as polyamides prepared from terephthalic acid and/or isophthalic acid and trimethylhexamethylenediamine; from adipic acid and m-xylenediamines; from adipic acid, azelaic acid, 2,2-bis-(p-aminocyclohexyl) propane, and from terephthalic acid and 4,4'-diaminodicyclohexylmethane. Mixtures and/or copolymers of two or more of the foregoing polyamides or prepolymers thereof, respectively, are also contemplated.

Furthermore, the polyamides may be made by many known methods, including the polymerization of a monoamino monocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above, together with substantially equimolar proportions of a diamine and a dicarboxylic acid. The dicarboxylic acid may be used in the form of a functional derivative thereof, for example, a salt, an ester or acid chloride.

Examples of the polyamides or nylons, as these are often called, include for example: polypyrrolidone (nylon 4), polycaprolactam (nylon 6), polycapryllactam (nylon 8), polyhexamethylene adipamide (nylon 6,6), polyundecanolactam (nylon 11), polydodecanolactam (nylon 12), polyhexamethylene azelaiamide (nylon 6,9), polyhexamethylene sebacamide (nylon 6,10), polyhexamethylene isophthalimide (nylon 6,I), polyhexamethylene terephthalamide (nylon 6,T), polyamide of hexamethylene diamine and n-dodecanedioic acid (nylon 6,12) as well as polyamides resulting from terephthalic acid and/or isophthalic acid and trimethyl hexamethylene diamine, polyamides resulting from adipic acid and meta xylenediamines, polyamides resulting from adipic acid, azelaic acid and 2,2-bis-(p-aminocyclohexyl)propane and polyamides resulting from terephthalic acid and 4,4'-diamino-dicyclohexylmethane. Some polyamide resins are described in ASTM standard D4066-01 "A Standard Classification System for Nylon Injection and Extrusion Materials". Exemplary polyamides are the polyamides 6,6; 6; 11; 12; 4,6; 9/T; and 6,6/T.

Copolymers of the foregoing polyamides or prepolymers thereof may be used. Such copolyamides include copolymers of the following: hexamethylene adipamide/caprolactam (nylon 6,6/6), hexamethylene adipamide/hexa-methylene-isophthalamide (nylon 6,6/6,I), hexamethylene adipamide/ hexa-methylene-terephthalamide (nylon 6,6/6,T) and hexamethylene adipamide/hexa-methylene-azelaiamide (nylon 6,6/6,9).

Mixtures and/or copolymers of two or more of the foregoing polyamides or prepolymers thereof, respectively, may be used.

In some embodiments the polyamide comprises a crystalline polyamide with a melting point (Tm), as determined by differential scanning calorimetry (DSC), of greater than or equal to 170° C. or, more specifically, 200 to 320° C. The polyamide may have a heat of fusion (also known as heat of melting), as determined by differential scanning calorimetry (DSC), of 10 to 100 Joules per gram (J/g). Crystalline polyamides can also have a crystallization temperature (Tc) of 120 to 250° C., with a heat of crystallization of −10 to −100 J/g as determined by DSC.

Polyamides may have a weight average molecular weight (Mw) of 10,000 to 100,000 grams per mole (g/mole). In some embodiments Mw can be 20,000 to 70,000 g/mole. Polyamides may have a relative viscosity (RV) of 20 to 100 units for example as measured by ASTM method D789 in formic acid at 25° C. In some embodiments the polyamide has an amine end group concentration of 30 to 100 milliequivalents/kilogram of polyamide resin (meq/Kg). With in that range the amine end group concentrations can be 40 to 80 meq/Kg.

The thermoplastic composition can comprise the polyimide in an amount of 30 to 70 wt % and the polyamide in an amount of 70 to 30 wt % based on the combined weight of the polyimide and the polyamide. In some embodiments the polyimide is present in an amount of 40 to 60 wt % and the polyamide is present in an amount of 60 to 40 wt %, based on the combined weight of the polyimide and the polyamide.

Without being bound by theory, it is thought that the reaction of the polyamide amine end groups with the organo phosphorus compound is important in developing improved melt strength. In some embodiments the polyamide amine end groups are present in a greater molar concentration than the organo phosphorus compound. In some embodiments the polyamide amine end groups are present in 1.5 to 3 times the molar concentration of the organo phosphorus compound.

The organo phosphorus compound can comprise phosphonites, phosphites, phosphates, and combinations comprising two or more of the foregoing. In some embodiments, such as phosphites or phosphonites the phosphorus atom will be trivalent and directly bonded to two or more oxygen atoms. In other embodiments the phosphorus atom will bonded to greater than or equal to three oxygen atoms. In yet other embodiments, such as phosphates, the phosphorus atom can be pentavalent, bonded to four oxygen atoms. In some embodiments the organo phosphorus compound has one or two phosphorus atoms per molecule. In some embodiments the organo phosphorus compound has a molecular weight of greater than or equal to 500 g/mole. The high molecular weight can help retain the organo phosphorus compound in the polymer melt at high processing temperature, for example over 300° C.

Exemplary organo phosphorus compounds are shown in formula (XIV)

(XIV)

wherein R' is independently at each occurrence a $C_6$-$C_{18}$ aryl, $C_1$-$C_{24}$ alkyl, $C_7$-$C_{30}$ alkylaryl, hydrogen, or any combination thereof and R" is independently at each occurrence a $C_6$-$C_{24}$ aryl, $C_2$-$C_{30}$ alkyl or $C_7$-$C_{36}$ alkylaryl. An example of such a compound is bis(di-tert-butyl phenyl) biphenyl phosphonite, PEPQ, available from Clariant Co.

Other exemplary organo phosphorus compounds are shown in formulas (XV), (XVI) and (XVII) wherein R' and R" are as defined above.

(XV)

(XVI)

(XVII)

Some exemplary compounds are tris-di-tert-butylphenyl phosphite available from Ciba Chemical Co. as IRGAPHOS 168 and bis(2,4-dicumylphenyl) pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl)methyl phosphite, bis(2,4-di-tert-butyl-6-methylphenyl)ethyl phosphite, 2,2',2"-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butylphenoxy)-1,3,2-dioxaphosphirane.

Examples of phosphates include: resorcinol bis(diphenyl phosphate), resorcinol bis(dixyl phosphate), bisphenol-A bis (diphenyl phosphate), bisphenol-A bis(dicresyl phosphate), biphenol bis(diphenyl phosphate), hydroquinone bis(diphenyl phosphate), triphenyl phosphate, tricresyl phosphate, phenyl bisdodecyl phosphate, phenyl bisneopentyl phosphate, phenyl ethylene hydrogen phosphate, phenyl-bis-3,5,5'-trimethylhexyl phosphate, ethyl diphenyl phosphate, 2-ethylhexyl di(p-tolyl), phosphate, diphenyl hydrogen phosphate, bis(2-ethyl-hexyl)$_p$-tolyl phosphate, tri tolyl phosphate, bis(2-ethylhexyl)-phenyl phosphate, tri(nonylphenyl)phosphate, phenyl-methyl hydrogen phosphate, di(dodecyl)$_p$-tolyl phosphate, isopropylated triphenyl phosphate, halogenated triphenyl phosphate, dibutylphenyl phosphate, 2-chlorethyldiphenyl phosphate, p-tolyl bis(2,5,5'-trimethylhexyl)phosphate, 2-ethylhexyldiphenyl phosphate.

Combinations comprising more than one organo phosphorous compound are contemplated. When used in combination the organo phosphorous compounds may be of the same type or different types. For example, a combination can comprise two phosphite or a combination can comprise a phosphite and a phosphonite.

The organo phosphorus compound may be used in an amount of 0.1 to 3.0 wt % based on the combined weight of the polyimide and polyamide. In some embodiments the organo phosphorus compound may be used in an amount of 0.3 to 2.0 wt %, or, more specifically 0.2 to 1.0 wt % based on the combined weight of the polyimide and polyamide.

The thermoplastic composition can further comprise an antioxidant, a stabilizer, a reinforcing filler, a colorant, a mold release agent, a lubricant, a flame retardant, a smoke suppressor, an anti-drip agent, an ultra violet stabilizer, an electrically conductive filler or a combination comprising two or more of the foregoing.

Antioxidants include hindered phenol antioxidants such as alkylated monophenols and alkylidene bisphenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha, alpha-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane and mixtures thereof.

The hindered phenol compound can have a molecular weight of greater than or equal to 500 g/mole. The high molecular weight can help retain the hindered phenol moiety in the polymer melt at high processing temperatures, for example greater than or equal to 300° C.

Stabilizers include Copper I and II salts and iodide salts. Copper I and II salts include cuprous iodide, cuprous chloride, cuprous acetate, cuprous stearate, cupric iodide, cupric acetate, cupric oleate and mixtures thereof. Copper salts may be present in an amount of 0.001 to 0.3 wt % based on the combined weight of the polyimide and polyamide. Iodide salts include alkali metal iodides. The iodine containing stabilizer, for example potassium iodide (KI), may be added in an amount of 0.01 to 0.3 wt % based on the weight of the polyimide and the polyamide. The stabilizers may be added to the polymer blends as powders or as aqueous solutions, suspensions or slurries.

Exemplary reinforcing fillers include glass fiber, mineral fillers, talc, clay (including nano clays), mica, barite, wollastonite, silica, milled glass, glass flake and combinations comprising two or more of the foregoing. Colorants include titanium dioxide, zinc sulfide and carbon black. Anti-drip agents, include those based on fluoro polymers. Additives to reduce wear and enhance lubricity include fluoro polymers and molybdenum disulfide. Electrically conductive fillers include carbon fibers and nanotubes, metal fibers, metal powders, metal flake, conductive carbon black, and combinations comprising two or more of the foregoing.

When present glass fiber can be a boro silicate "E" glass or equivalent. The average fiber diameter can be 5 to 20 micrometers, or, more specifically, 10 to 17 micrometers. Glass fiber can be present in an amount up to 50 wt %, or, more specifically, 5 to 30 wt % based on the combined weight of polyimide and polyamide. Fiber filled blends can have a flexural modulus of 4,000 to 8,000 megaPascals (MPa) and a flexural strength of 150 to 250 MPa. In some embodiments comprising glass fiber, titanium dioxide, if present, is present in an amount less than or equal to 0.2 wt %, based on the combined weight of polyimide and polyamide. The high Mohs hardness (5.5 to 6.5) of the titanium dioxide can result in glass fiber breakage during compounding and melt processing giving reduced impact, tensile and flexural strength in the composition. In some embodiments, when glass fibers are present in the composition, fillers or colorants with a Mohs hardness of less than 4.0 are used.

The thermoplastic composition can have an HDT at 66 psi (1.8 MPa) of greater than or equal to 175° C. as measured on a molded part 15.2 cm×1.27 cm×0.32 according to ASTM D648. In some embodiments the composition has an HDT at 66 psi (1.8 MPa) greater than or equal to 190° C., or, more specifically, 175 to 250° C.

The composition can have a reverse notched (RN) Izod impact strength, as measured according to ASTM D256 on ⅛ inch (3.2 mm) thick molded parts, of greater than or equal to 250 J/m, or, more specifically, 300 to 1000 J/m.

The compositions can be prepared by mechanically melt blending the components in conventional mixing equipment, e.g., a single or twin screw extruder, Banbury mixer, or any other conventional melt blending equipment. A vacuum may also be applied to during the melt blending operation to reduce volatile materials in the compositions.

The compositions can be formed into shaped articles by blow molding. The blow molding process may use any conventional blow molding equipment capable of handling high melt temperatures. The composition may be dried to a moisture content less than or equal to 150 ppm, or, more specifically, less than or equal to 100 ppm. Drying can be achieved using numerous commercial drying devices. An exemplary device is a dehumidifying dryer. When the composition is dried in the presence of oxygen it can be desirable to dry the composition at a temperature sufficiently low to prevent yellowing of the composition.

The composition can be melted using, for example, a screw device at 270 to 370° C. The molten composition can then be pushed through an orifice or die to crate an annular tube with a wall thickness of 1 to 15 mm, or, more specifically, 2 to 15, or, even more specifically, 3 to 10 mm. In some embodiments the minimum outer diameter of the extruded annular tube, as it leaves the orifice, is 2 to 100 centimeters (cm). The continuous annular tube can be extruded to a length of greater than or equal to 5 cm, and in some embodiments up to 200 cm.

The annular tube can then be closed off, for instance using a mechanical pinching device, to seal the tube at one end. Air or another gas such as nitrogen can be introduced into the molten polymer tube under pressure (for example 1 to 50 psi (0.007 to 0.34 MPa)) to expand the tube. In other instances suction can be used to expand the molten polymer tube. If desired a mold can encase the tube to give a desired shape. The expansion of the molten tube from its extruded form to its expanded blow molded shape should result in a minimum outer diameter of greater than or equal to 1.3 times that of the molten extruded tube. In some embodiments the expansion ratio will be 1.4 to 3.0, or, more specifically, 1.5 to 2.5. If a crystalline polyamide in used in the composition the expansion of the tube should be accomplished while the melt temperature is above the polyamide crystallization temperature (Tc).

The blow molded article can then be cooled after or during expansion. If a crystalline resin is used as a major component of the composition cooling can be continued to a temperature less than or equal to (Tc −10° C.). If the composition comprises predominately amorphous resins cooling can be continued to a temperature less than or equal to (Tg of the majority resin −10° C.). Majority resin is defined as the polymer present in the greatest amount based on the total weight of the composition. The article can then be removed by opening the mold. Any excess composition, for example, caused by closing of the mold may be trimmed from the article. Such excess composition can be ground up and reused in the process. Often such excess composition may be mixed in an amount of 1 to 40 wt % with composition that has not been blow molded.

In some embodiments the wall thickness of the cooled article will be at least 1 mm but less than 15 mm. The wall thickness of the final part can be 1 to 15 mm, or, more specifically, 2 to 15 mm. In some embodiments there is less than 20% variation in wall thickness comparing the thinnest wall section to the thickest wall section in the article. In some embodiments the wall thickness will be 3 to 10 mm with less than a 20% variation in wall thickness. The minimum diameter, or smallest cross section, of the final part can be 2 to 100 cm.

Large blow molded articles made from the composition can have a minimum outer diameter of greater than or equal to 2 cm. In some embodiments the minimum outer diameter is 2 to 50 cm. In some embodiments the article can be longer than 5 cm, or, more specifically, 5 to 200 cm in its longest aspect. The blow molded article can weigh 50 to 5,000 grams, or, more specifically, the blow molded article can weigh 500 to 5,000 grams.

Articles can be tubes, ducts, hoses, pipes, connectors, conduits, enclosures for electrical equipment, parts of air handling systems, parts of motors, compressors, mufflers, parts of heating systems, kettles, carafes, bottles, jars, reservoirs, fuel or oil tanks and the like. Parts can also have several different layers of materials.

The compositions are further described by the following non-limiting examples.

EXAMPLES

Material Descriptions

PEI: ULTEM 1000 polyetherimide commercially available from GE Plastics, Mw=55,000 (GPC, PS standards), Tg=221° C. PEI contained 0.1% hindered phenol IRGANOX 1010 and 0.1 wt % tris(di-2,4-tert-butyl phenyl) phosphite, IRGAPHOS 168. GPC was done as per ASTM D5296, polystyrene standards were used for calibration.

PA 6: Nylon 6, relative viscosity (RV)=58, amine ($NH_2$) end groups=75 meq/kg resin, Tm=222° C., heat of fusion was approximately 52 J/g (second heat), Tc=169° C., heat of crystallization was approximately −60 J/g (first cool).

GF (Glass fibers)=chopped borosilicate E glass, 11 micrometer diameter, OC165A commercially available from Owens Corning Co.

Phos 1: PEPQ, bis(di-tert-butyl phenyl) biphenyl phosphonite commercially available from Clariant Co. Mw approximately 1035.

Phos 2=DOVERPHOS S-9228, bis(2,4-dicumylphenyl) pentaerythritol diphosphite from Dover Chemical Co., Mw=852.

Phos 3=IRGAPHOS 168, tris(di-tert-butyl phenyl) phosphite from Ciba Chemical Co. Mw=646.

Phos 4=FYROFLEX RDP, resorcinol bis(diphenyl phosphate) from Akzo Nobel Co. Mw=approximately 574.

Phos 5=FYROFLEX BDP, bisphenol-A bis(diphenyl phosphate) from Akzo Nobel Co. Mw=approximately 692.

Hindered Phenol=IRGANOX 1076, octadecyl 3,5-di-tert-butyl-4-hydroxyhydrocinnamate from Ciba Chemical Co., Mw=531.

Techniques and Procedures

Blends were prepared by extrusion of mixtures of the polyamide 6, polyetherimide and other ingredients as indicated in the Tables on a 2.5 inch (63.5 mm) single-screw vacuum vented extruder. Compositions are listed in wt % of the total composition. The extruder was set at about 305 to 320° C. The blends were run at about 55 to 145 rotations per minute (rpm) under vacuum using a mild mixing screw, vacuum was approximately 20 inches (508 mm) Hg. The extrudate was cooled, pelletized and dried at 95° C. Test samples were injection molded at a set temperature of 305 to 320° C. and mold temperature of 120° C., screw speed approximately 60 rpm, 50 psi (0.344 MPa) back pressure using a 30 second cycle time.

Some properties were measured using ASTM test methods. All samples were conditioned for at least 48 hours at 50% relative humidity prior to testing. Heat distortion temperature (HDT) was measured at 66 psi (0.45 MPa) and 264 psi (1.82 MPa) on 3.2 mm thick bars as per ASTM D648. Tensile properties were measured on 3.2 mm type I bars as per ASTM method D638, cross head speed was 50 mm/min. Tensile modulus (T. Mod) was measured as tangent, tensile strength (T. Str) was measured at yield. Flexural modulus (F. Mod) and flexural strength (F. Str) were measured as per ASTM method D790 on 3.2 mm bars. Izod impact strength; notched (N) and reverse notched (RN), were measured as per ASTM method D 256 using a 5 pound (2.2 kilogram) hammer on 3.2 mm bars. Melt viscosity (Visc) was measured in poise (P) at 330° C. and viscosities versus shear rate (radian/sec.) were measured at 330° C. on an ARES brand strain controlled parallel plate rheometer, from TA Instruments, as per ASTM method D4440. Pellet samples were dried for greater than or equal to 4 hours at 95° C. prior to testing. The parallel plate gap was set at 1.0 mm, strain was 20%. Samples were preheated for 6 minutes before recording data. Viscosity was recorded from 0.5 to 500 radians/sec. The viscosity ratio at low shear (1 rad/sec.) and high shear (100 rad/sec.) at 330° C. were recorded and the ratio of low to high shear viscosity calculated. DSC was done with a heating rate of 20° C./min; Tm (melting temperature) and heat of fusion/melting was recorded on the second heat, Tc (crystallization temperature) and heat of crystallization was recorded on the first cooling cycle.

Note that letters designate comparative examples while numbers designate examples of the invention.

Results

Table 1 shows the properties of various 15 wt % glass filled blends of about 45 wt % PEI and 40 wt % polyamide 6 with an added phosphorus containing compound, (Phos 1=PEPQ).

The blends have high flexural strength (>180 MPa) and high heat distortion (66 psi HDT ≥190° C.). Note the improvement in RN Izod (>350 J/m) values for examples 1 to 5 versus control blend A. The control blend A, with no added phosphorus compound, has low melt strength at 330° C. as shown by the ratio of low shear (1 rad/sec) to high shear (100 rad/sec) viscosity (3.60) and cannot consistently be blow molded into large (for example ≥30 mm diameter) ductwork, or tubes, of uniform wall thickness. This low viscosity ratio (less than 4.0) indicates that the resin will not show high melt elasticity and will have limited use in blow molding processes. However addition of even a low level (0.2 wt %) of Phos 1 brings a sharp increase in melt viscosity raising the melt viscosity at 100 rad/sec at 330 C. to above 3000 poise, as well as raising the low to high shear viscosity ratio. This viscosity ratio is increased to >6 and in most cases over 8. This high melt strength gives a more elastic composition with easier melt forming by processes such a blow molding. Such blow molded articles will have high heat resistance and high stiffness and strength, with good practical impact.

TABLE 1

|  | A | 1 | 2 | 3 | 4 | 5 |
| --- | --- | --- | --- | --- | --- | --- |
| PEI | 45.0 | 44.8 | 44.6 | 44.4 | 44.2 | 44.0 |
| PA 6 | 40.0 | 40.0 | 40.0 | 40.0 | 40.0 | 40.0 |
| GF | 15.0 | 15.0 | 15.0 | 15.0 | 15.0 | 15.0 |
| Phos 1 |  | 0.2 | 0.4 | 0.6 | 0.8 | 1.0 |
| Flex Mod (MPa) | 6080 | 4960 | 5370 | 5270 | 5440 | 5380 |
| Flex Str (MPa) | 188 | 187 | 202 | 198 | 199 | 194 |
| HDT 66 psi (° C.) | 203 | 208 | 209 | 209 | 208 | 208 |
| HDT 264 psi (° C.) | 191 | 182 | 191 | 190 | 189 | 189 |
| N Izod (J/m) | 44 | 50.7 | 49.1 | 46.3 | 49.3 | 43.9 |
| RN Izod (J/m) | 214 | 463 | 416 | 410 | 381 | 362 |
| T Mod (MPa) | 8340 | 6570 | 6710 | 6670 | 6480 | 6910 |
| T Str (MPa) | 120 | 107 | 108 | 106 | 107 | 105 |
| Visc at 330° C. (P) |  |  |  |  |  |  |
| 1 rad/sec | 6458 | 24013 | 36236 | 45499 | 52238 | 40511 |
| 10 rad/sec | 3269 | 9621 | 11957 | 13956 | 15034 | 13621 |
| 100 rad/sec | 1795 | 3796 | 4375 | 4923 | 4778 | 4252 |
| Visc. ratio 1:100 rad/s | 3.60 | 6.33 | 8.28 | 9.24 | 10.93 | 9.53 |

FIG. 1 shows the increase in the ratio of the low to high shear viscosity at 330° C. of a Example A and Examples 1 to 5 as a function of added phosphorus compound.

Table 2 shows the effectiveness of phosphorus compounds 2 and 3 at improving the melt strength of a GF-PEI-PA6 blend. Phos 2 and 3 used in examples 6 and 7 are phosphites that are also effective in improving melt viscosity and increasing melt strength (the low to high shear melt viscosity ratio). Surprisingly the mono phosphorus compound (Phos 3, example 7), having only one phosphorus atom in its molecular structure, increases the melt viscosity and the melt viscosity ratio at a value comparable to Phos 1 (example 2) and Phos 2 (example 6) which have two phosphorus atoms in their chemical structure.

TABLE 2

|  | A | 6 | 7 |
| --- | --- | --- | --- |
| PEI | 45.0 | 44.6 | 44.6 |
| PA 6 | 40.0 | 40.0 | 40.0 |
| GF | 15.0 | 15.0 | 15.0 |
| Phos 2 |  | 0.4 |  |
| Phos 3 |  |  | 0.4 |
| F. Mod (MPa) | 6080 | 4870 | 5100 |
| F. Str (MPa) | 188 | 190 | 197 |
| HDT 66 psi (° C.) | 203 | 206 | 208 |

TABLE 2-continued

|  | A | 6 | 7 |
| --- | --- | --- | --- |
| HDT 264 psi (° C.) | 191 | 183 | 187 |
| N Izod (J/m) | 44 | 49.1 | 53.1 |
| RN Izod (J/m) | 214 | 503 | 418 |
| T. Mod (MPa) | 8340 | 6200 | 6690 |
| T.Str (Y) (MPa) | 120 | 124 | 132 |
| Visc at 330° C. (P) |  |  |  |
| 1 rad/sec | 6458 | 29950 | 24505 |
| 10 rad/sec | 3269 | 7991 | 7201 |
| 100 rad/sec | 1795 | 2920 | 2743 |
| Visc. ratio 1:100 rad/s | 3.60 | 10.26 | 8.93 |

Table 3 shows the addition of non-phosphorus containing compounds to the composition. Example 8 has added heat stabilizers: cuprous iodide (CuI), added at 0.05 wt %, and 0.3 wt % potassium iodide (KI). Potassium iodide was added as a 33% aqueous solution in deionized water to help dispersion. CuI was added as a fine powder. Example 9 additionally had a hindered phenol as an antioxidant. Note that neither of the three antioxidants, CuI, KI or hindered phenol, has a detrimental effect on the increased melt viscosity and the high melt viscosity ratio achieved by addition of 0.4 wt % Phos 1. The HDT (66 psi) was above 200° C., flex modulus and flex strength remained high; greater than 5,000 MPa and greater than 190 MPa respectively.

TABLE 3

|  | 8 | 9 |
| --- | --- | --- |
| PEI | 44.3 | 44.1 |
| PA 6 | 40.0 | 40.0 |
| GF | 15.0 | 15.0 |
| Phos 1 | 0.4 | 0.4 |
| Cuprous iodide | 0.05 | 0.05 |
| Potassium iodide | 0.3 | 0.3 |
| Hindered Phenol |  | 0.2 |
| Flex Mod (MPa) | 5230 | 5220 |
| Flex Str (MPa) | 201 | 198 |
| HDT 66 psi (° C.) | 208 | 207 |
| HDT 264 psi (° C.) | 188 | 189 |
| N Izod (J/m) | 46.3 | 47.9 |
| RN Izod (J/m) | 430 | 480 |
| T Mod (MPa) | 6960 | 6690 |
| T Str (MPa) | 107 | 110 |

TABLE 3-continued

|  | 8 | 9 |
|---|---|---|
| Visc at 330° C. (P) | | |
| 1 rad/sec | 40080 | 51307 |
| 10 rad/sec | 12297 | 14731 |
| 100 rad/sec | 4127 | 4795 |
| Visc. ratio 1:100 rad/s | 9.71 | 10.70 |

Table 4 shows the additional examples using phos 1 in the composition. Example 10 is a replicate of example 1, again showing high melt strength and good thermal and mechanical properties. Example 11 shows that at higher PEI content and lower PA6 content, Phos 1 is still effective at increasing melt strength and melt viscosity ratio over a control B with no added phosphorus compound.

TABLE 4

|  | A | 10 | B | 11 |
|---|---|---|---|---|
| PEI | 45.0 | 44.8 | 55.0 | 54.8 |
| PA 6 | 40.0 | 40.0 | 30.0 | 30.0 |
| GF | 15.0 | 15.0 | 15.0 | 15.0 |
| Phos 1 | — | 0.2 | — | 0.2 |
| F. Mod (MPa) | 6080 | 5840 | 6240 | 6010 |
| F. Str (MPa) | 188 | 199 | 186 | 189 |
| HDT 66 psi (° C.) | 203 | 207 | 209 | 206 |
| HDT 264 psi (° C.) | 191 | 190 | 197 | 190 |
| N Izod (J/m) | 44 | 49 | 50 | 46 |
| RN Izod (J/m) | 214 | 271 | 378 | 339 |
| T. Mod (MPa) | 8340 | 7930 | 8900 | 8830 |
| T.Str (Y) (MPa) | 120 | 142 | 137 | 127 |
| Visc at 330° C. (P) | | | | |
| 1 rad/sec | 6458 | 19020 | 4722 | 16211 |
| 10 rad/sec | 3269 | 7615 | 2372 | 7498 |
| 100 rad/sec | 1795 | 3203 | 1305 | 3314 |
| Visc. ratio 1:100 rad/s | 3.60 | 5.94 | 3.62 | 4.89 |

Table 5 (examples 12 and 13) shows the fiber glass is not essential to the increase in melt viscosity and the increase in 1 to 100 (rad/sec.) melt viscosity ratio achieved by addition of 0.2 wt % of Phos 1. Note the low 1 to 100 rad/sec viscosity ratio (3.89) in the blend (C) with no added phosphorus compound is increased to 8.00 in example 12.

TABLE 5

|  | C | 12 | 13 |
|---|---|---|---|
| PEI | 47.1 | 46.9 | 52.7 |
| PA 6 | 52.9 | 52.9 | 47.1 |
| Phos 1 | | 0.2 | 0.2 |
| Flex Mod (MPa) | 2750 | 3020 | 3050 |
| Flex Str (MPa) | 117 | 123 | 126 |
| HDT 66 psi (° C.) | 172 | 180 | 179 |
| HDT 264 psi (° C.) | 81 | 84 | 108 |
| N Izod (J/m) | 57.7 | 53.8 | 50.7 |
| RN Izod (J/m) | 1530 | 342 | 639 |
| T Mod (MPa) | 3370 | 3370 | 3540 |
| T Str (MPa) | 70.6 | 67.4 | 70.1 |
| Visc at 330° C. (P) | | | |
| 1 rad/sec | 4580 | 10968 | 6596 |
| 10 rad/sec | 2044 | 3149 | 2353 |
| 100 rad/sec | 1178 | 1372 | 1224 |
| Visc. ratio 1:100 rad/s | 3.89 | 8.00 | 5.39 |

Table 6 shows the effectiveness of organo phosphorus compounds Phos 4 and Phos 5, which are phosphates containing two phosphorus atoms per molecule and having a molecular weight above 500, at improving the melt strength of a GF-PEI-PA6 blend. Phos 4 and 5 used in examples 14 and 15 are phosphates that improve melt viscosity and increasing melt strength (the low to high shear melt viscosity ratio). In example 14 using 0.4 wt % of (resorcinol bis(diphenyl phosphate) (Phos 4) the low to high shear viscosity ratio at 330° C. is increased to 8.77 when compared to Example A. In example 15 using 0.4 wt % bisphenol-A bis(diphenyl phosphate) (Phos 5) the low to high shear viscosity ratio is increase to 9.75 when compared to Example A.

TABLE 6

|  | 14 | 15 |
|---|---|---|
| PEI | 44.6 | 44.6 |
| PA 6 | 40.0 | 40.0 |
| GF | 15.0 | 15.0 |
| Phos 4 | 0.4 | |
| Phos 5 | | 0.4 |
| Flex Mod Mpa | 5110 | 5070 |
| Flex Str Mpa | 201 | 201 |
| HDT 66 psi ° C. | 208 | 208 |
| HDT 264 psi ° C. | 190 | 188 |
| N Izod J/m | 43 | 52 |
| RN Izod J/m | 349 | 450 |
| Visc @ 330° C. | | |
| 1 rad/sec | 29634 | 45849 |
| 10 rad/sec | 8619 | 13000 |
| 100 rad/sec | 3378 | 4702 |
| Visc. ratio 1:100 rad/s | 8.77 | 9.75 |

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

We claim:

1. A thermoplastic blow molding composition consisting of:
   a) 40 to 60 weight percent of a crystalline polyamide having a melting point of 200 to 320° C.;
   b) 60 to 40 weight percent of a polyetherimide having a glass transition temperature of 200 to 310° C. and a weight average molecular weight of 10,000 to 70,000 grams per mole as measured by gel permeation chromatography using a polystyrene standard;
   c) 0.2 to 1.0 weight percent of an organo phosphorus compound having only one phosphorus atom in its molecular structure, a molecular weight of greater than or equal to 500 grams per mole, and selected from the group consisting phosphonite, phosphite, phosphate and combinations of two or more of the foregoing organo phosphorus compounds;
   d) an additive comprising an alkali metal iodide, a copper salt, a hindered phenol compound, or a combination comprising two or more of the foregoing, and
   optionally e) an antioxidant, a stabilizer, a reinforcing filler, a colorant, a mold release agent, a lubricant, a smoke suppressor, an anti-drip agent, an ultra violet stabilizer, an electrically conductive filler or a combination comprising two or more of the foregoing, wherein the composition has a ratio of melt viscosity at a shear rate of 1 radian per second to a melt viscosity at 100 radians per second (rad/sec), of 4.0 to 12.0, at 330° C.; a reverse notched Izod impact strength of greater than or equal to 250 Joules per meter (J/m), and a heat distortion temperature, measured at 66 psi (0.45 MPa), of greater than or equal to 190° C.; and further wherein weight percent is based on the combined weight of polyimide and polyamide.

2. The thermoplastic blow molding composition of claim 1, wherein the crystalline polyamide has an amine end group concentration of 30 to 100 milliequivalents.

3. A thermoplastic blow molding composition consisting of:
  a) 40 to 60 weight percent of a crystalline polyamide having a melting point of 200 to 320° C.;
  b) 60 to 40 weight percent of a polyetherimide having a glass transition temperature of 200 to 310° C. and a weight average molecular weight of 10,000 to 70,000 grams per mole as measured by gel permeation chromatography using a polystyrene standard;
  c) 5 to 30 weight percent of glass fiber having an average fiber diameter of 5 to 20 micrometers;
  d) 0.2 to 1.0 weight percent of an organo phosphorus compound having only one phosphorus atom in its molecular structure, a molecular weight of greater than or equal to 500 grams per mole and selected from the group consisting phosphonite, phosphite, phosphate and combinations of two or more of the foregoing organo phosphorus compounds;
  and optionally an antioxidant, a stabilizer, a reinforcing filler, a colorant, a mold release agent, a lubricant, a smoke suppressor, an anti-drip agent, an ultra violet stabilizer, an electrically conductive filler or a combination comprising two or more of the foregoing
  wherein the composition has a ratio of melt viscosity at a shear rate of 1 radian per second to a melt viscosity at 100 radians per second (rad/sec), of 4.0 to 12.0, at 330° C.; a reverse notched Izod impact strength of greater than or equal to 250 Joules per meter (J/m), and a heat distortion temperature, measured at 66 psi (0.45 MPa), of greater than or equal to 190° C.; and
  further wherein weight percent is based on the combined weight of polyimide and polyamide.

4. The thermoplastic blow molding composition of claim 3, wherein the crystalline polyamide has an amine end group concentration of 30 to 100 milliequivalents.

5. A process for blow molding an article comprising:
  drying a thermoplastic composition to a moisture content less than 150 parts by weight per million parts by weight of the thermoplastic composition to form a dried thermoplastic composition;
  heating the dried thermoplastic composition in a screw driven melt processing device to a temperature of 270 to 370° C. to form a molten composition;
  pushing the molten composition through an orifice to create an annular tube with a wall thickness of 1 to 15 millimeters (mm), an outer diameter of 2 to 100 centimeters (cm), and a length of greater than or equal to 5 centimeters (cm);
  closing off an end of the annular tube to form a closed ended annular tube and encasing it in a mold;
  blowing a gas into the closed ended annular tube while the polymer blend is still above the crystallization temperature of the polyamide until the closed ended tube has an outer diameter that is greater than or equal to 1.3 times the outer diameter of the annular tube and assumes the shape of the mold to form a shaped tube;
  cooling the shaped tube to temperature below the polyamide crystallization temperature to form the article;
  opening the mold and removing the article,
  wherein at least a portion of the article is hollow and the largest inner diameter is greater than or equal to 26 millimeters;
  wherein the thermoplastic composition consists of:
  a) 40 to 60 wt % of a crystalline polyamide having a melting point of 200 to 320° C.;
  b) 60 to 40 wt % polyetherimide having a glass transition temperature of 200 to 310° C. and a weight average molecular weight of 10,000 to 70,000 grams per mole as measured by gel permeation chromatography using a polystyrene standard;
  c) 5 to 30 wt % of glass fiber having an average fiber diameter of 5 to 20 micrometers;
  d) 0.2 to 1.0 wt % of an organo phosphorus compound having only one phosphorus atom in its molecular structure, a molecular weight of greater than or equal to 500 grams per mole and selected from the group consisting phosphonite, phosphite, phosphate and combinations of two or more of the foregoing organo phosphorus compounds;
  and optionally an antioxidant, a stabilizer, a reinforcing filler, a colorant, a mold release agent, a lubricant, a smoke suppressor, an anti-drip agent, an ultra violet stabilizer, an electrically conductive filler or a combination comprising two or more of the foregoing, and;
  wherein the composition has a ratio of melt viscosity at a shear rate of 1 radian per second to a melt viscosity at 100 radians per second, of 4.0 to 12.0, at 330° C.;
  wherein weight percent is based on the combined weight of polyimide and polyamide.

6. An article made by the process of claim 5 wherein the minimum outer diameter is greater than or equal to 2 centimeters.

7. The article of claim 6, wherein the article is selected from the group consisting of tubes, ducts, hoses, pipes, connectors, conduits, enclosures for electrical equipment, parts of air handling systems, parts of motors, compressors, mufflers, parts of heating systems, kettles, carafes, bottles, jars, reservoirs, fuel tanks, and oil tanks.

8. The article of claim 6, wherein the article has a minimum wall thickness of 1 to 15 millimeters.

9. The article of claim 6, wherein the article has a weight greater than or equal to 50 grams.

10. A blow molded article prepared using the composition of claim 1.

* * * * *